United States Patent
Pystynen et al.

(10) Patent No.: US 11,430,178 B2
(45) Date of Patent: Aug. 30, 2022

(54) THREE-DIMENSIONAL VIDEO PROCESSING

(71) Applicant: Nokia Technologies Oy, Espoo (FI)

(72) Inventors: Johannes Pystynen, Tampere (FI); Kimmo Roimela, Tampere (FI); Mika Pesonen, Tampere (FI); Johannes Rajala, Julkujarvi (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/634,816

(22) PCT Filed: Jun. 11, 2018

(86) PCT No.: PCT/FI2018/050432
§ 371 (c)(1),
(2) Date: Jan. 28, 2020

(87) PCT Pub. No.: WO2019/030427
PCT Pub. Date: Feb. 14, 2019

(65) Prior Publication Data
US 2021/0125399 A1     Apr. 29, 2021

(30) Foreign Application Priority Data
Aug. 8, 2017  (GB) .................................... 1712687

(51) Int. Cl.
*G06T 15/00*    (2011.01)
*G06T 15/20*    (2011.01)
(Continued)

(52) U.S. Cl.
CPC .............. *G06T 15/205* (2013.01); *G06T 7/50* (2017.01); *G06T 15/08* (2013.01); *G06T 2200/04* (2013.01); *G06T 2207/10016* (2013.01)

(58) Field of Classification Search
CPC ........ G06T 15/405; G06T 1/60; G06T 15/005
(Continued)

(56) References Cited

U.S. PATENT DOCUMENTS 5,990,904 A    11/1999  Griffin
6,577,679 B1    6/2003  Apostolopoulos
(Continued)

FOREIGN PATENT DOCUMENTS

EP    1950706 A2    7/2008
EP    2180449 A1    4/2010
(Continued)

OTHER PUBLICATIONS

Nyland LS, McAllister DK, Popescu V, McCue C, Lastra AA. Interactive exploration of acquired 3D data. In28th AIPR Workshop: 3D Visualization for Data Exploration and Decision Making May 5, 2000 (vol. 3905, pp. 46-57). International Society for Optics and Photonics. (Year: 2000).*

(Continued)

*Primary Examiner* — Phu K Nguyen
(74) *Attorney, Agent, or Firm* — Harrington & Smith

(57) ABSTRACT

A method and system for three-dimensional video content processing is disclosed comprising an operation of receiving first video data representing three-dimensional video content arranged as a plurality of first tiles associated with respective sub-areas of an image. Another operation comprises providing data indicating for each first tile a depth range of video content within said tile. Another operation comprises determining for each first tile a respective volume based on the depth range. Another operation comprises determining a field of view of a user in relation to the first tile volumes. Another operation comprises rendering of the first video data for one or more first tiles only if their determined volume is at least partially within the field of view.

20 Claims, 13 Drawing Sheets

(51) Int. Cl.
*G06T 7/50* (2017.01)
*G06T 15/08* (2011.01)

(58) Field of Classification Search
USPC .......................................................... 345/418
See application file for complete search history.

(56) References Cited

U.S. PATENT DOCUMENTS

| | | | |
|---|---|---|---|
| 7,139,003 B1 | 11/2006 | Kirk et al. | |
| 7,170,515 B1* | 1/2007 | Zhu | G06T 15/005 345/422 |
| 7,755,624 B1 | 7/2010 | Hakura et al. | |
| 8,089,486 B2* | 1/2012 | Anderson | G06T 15/005 345/506 |
| 8,331,627 B2* | 12/2012 | Xiong | G06T 3/4053 382/109 |
| 9,165,348 B2 | 10/2015 | Toth et al. | |
| 9,311,743 B2* | 4/2016 | Wang | G06T 15/005 |
| 9,324,180 B2* | 4/2016 | Andersson | G06T 15/405 |
| 9,418,471 B2* | 8/2016 | Hasselgren | G06T 15/005 |
| 9,460,551 B2* | 10/2016 | Pettersson | H04N 19/167 |
| 10,249,079 B2* | 4/2019 | Akenine-Moller | G06T 15/405 |
| 10,672,197 B2* | 6/2020 | Bates | G06F 3/012 |
| 10,896,523 B2* | 1/2021 | Mavridis | H04N 19/597 |
| 2005/0195187 A1 | 9/2005 | Seiler et al. | |
| 2014/0176553 A1 | 6/2014 | Pettersson et al. | |
| 2015/0109293 A1 | 4/2015 | Wang et al. | |
| 2016/0203635 A1 | 7/2016 | Wyman et al. | |
| 2017/0094262 A1 | 3/2017 | Pettersson et al. | |
| 2018/0082431 A1* | 3/2018 | Andersson | G06T 1/20 |
| 2019/0197786 A1* | 6/2019 | Molyneaux | G06T 15/08 |
| 2021/0142581 A1* | 5/2021 | Molyneaux | G06T 15/20 |
| 2021/0248829 A1* | 8/2021 | Steinbrucker | G06T 19/00 |

FOREIGN PATENT DOCUMENTS

| | | |
|---|---|---|
| EP | 3200157 A2 | 8/2017 |
| WO | 2010/035223 A1 | 4/2010 |
| WO | 2019/034804 A2 | 2/2019 |

OTHER PUBLICATIONS

Popov AV. An Efficient Depth Linearization Method for Oblique View Frustums. Journal of Computer Graphics Techniques vol. 2016;5(4). (Year: 2016).*
McAllister DK, Nyland L, Popescu V, Lastra A, McCue C. Real-time rendering of real world environments. InEurographics Workshop on Rendering Techniques Jun. 21, 1999 (pp. 145-160). Springer, Vienna. (Year: 1999).*
DROBOT, Improved Culling for Tiled and Clustered Rendering, Siggraph2017, Aug. 3, 2017, pp. 1-82.*
Olsson, O., Billeter, M. and Assarsson, U., Jun. 2012. Clustered deferred and forward shading. In Proceedings of the Fourth ACM SIGGRAPH/Eurographics conference on High-Performance Graphics (pp. 87-96).*
Yoon SE, Salomon B, Manocha D. Interactive view-dependent rendering with conservative occlusion culling in complex environments. InIEEE Visualization, 2003. VIS 2003. Oct. 19, 2003 (pp. 163-170). IEEE.*
"PowerVR Hardware—Architecture Overview for Developers", Imagination Technologies Limited, Apr. 7, 2017, pp. 1-15.
Andersson et al., "Masked Depth Culling for Graphics Hardware", ACM Transactions on Graphics (TOG), vol. 34, No. 6, Article No. 188, Nov. 2015, 9 pages.
Search Report received for corresponding United Kingdom Patent Application No. 1712687.1, dated Feb. 1, 2018, 4 pages.
International Search Report and Written Opinion received for corresponding Patent Cooperation Treaty Application No. PCT/FI2018/050432, dated Dec. 4, 2018, 15 pages.
Lischinski et al., "Image-Based Rendering for Non-Diffuse Synthetic Scenes", Proceedings of the Eurographics Workshop in Vienna, Austria, Nov. 16, 2004, 15 pages.

* cited by examiner

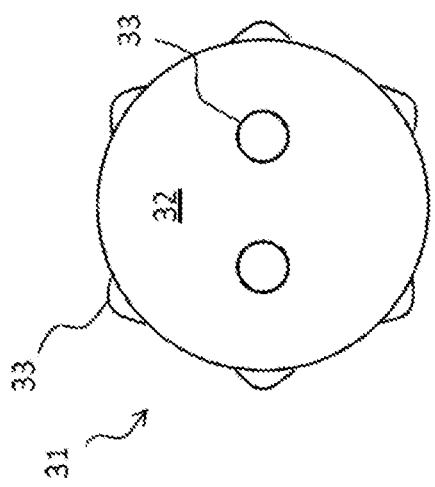
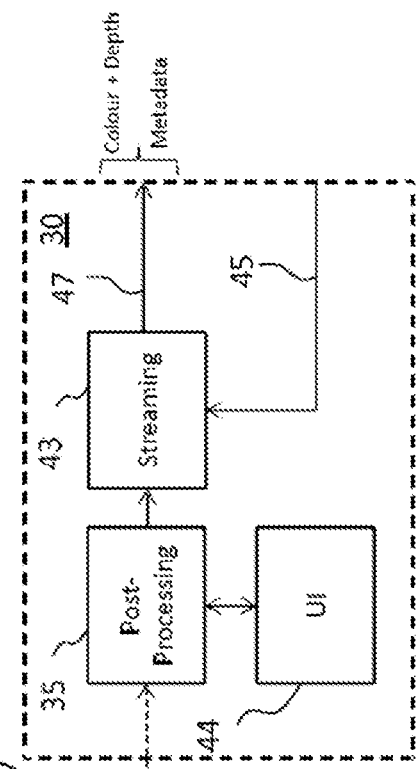
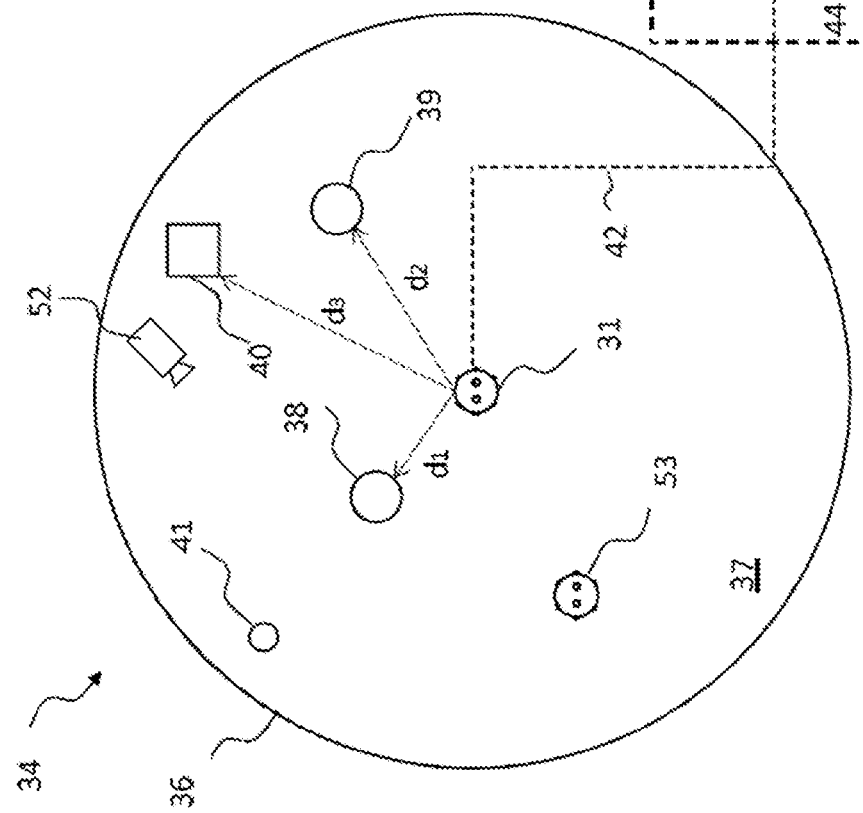
Fig. 3
Fig. 4

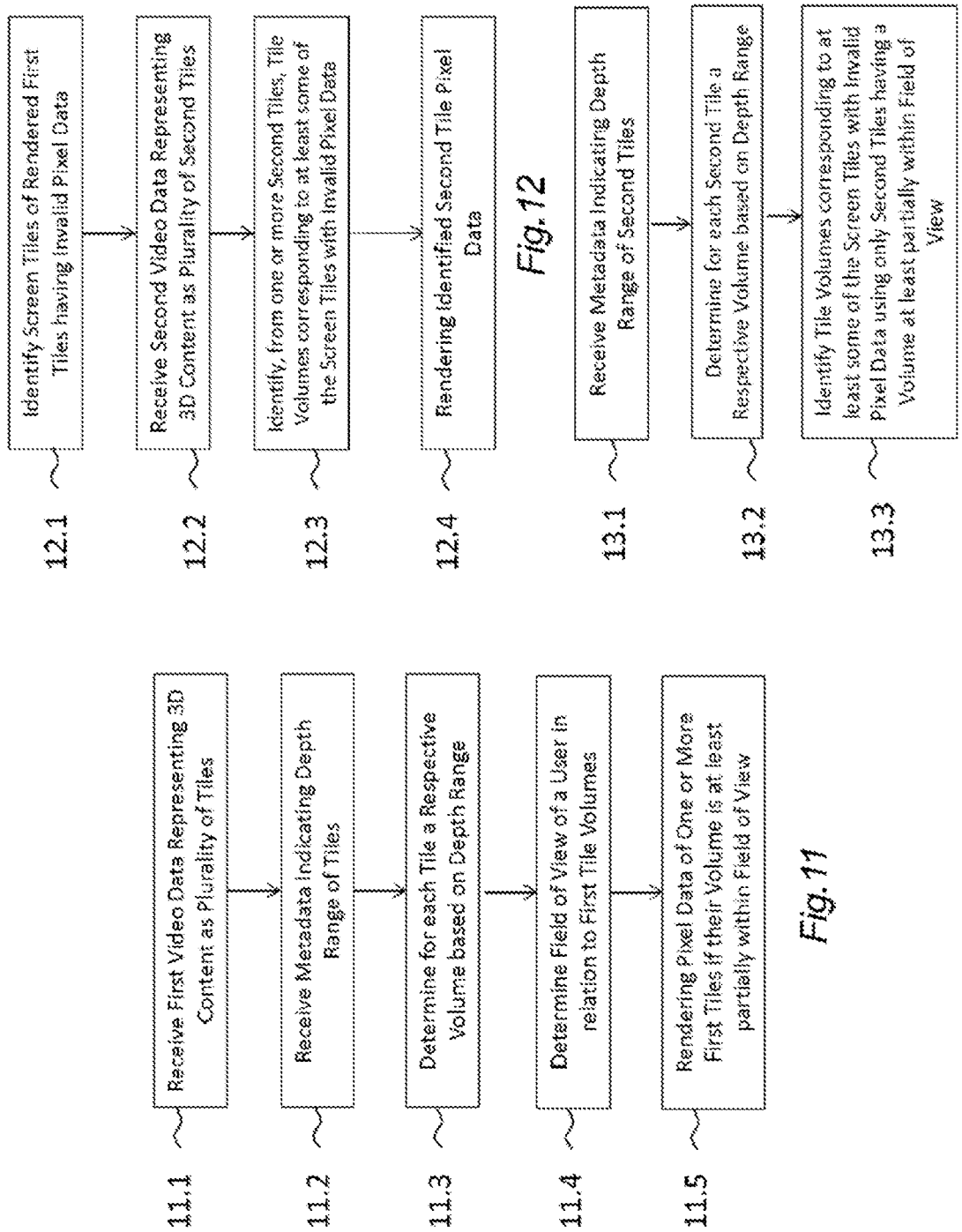

THREE-DIMENSIONAL VIDEO PROCESSING

RELATED APPLICATION

This application was originally filed as PCT Application No. PCT/FI2018/050432, filed on Jun. 11, 2018, which claims priority from GB Application No. 1712687.1, filed on Aug. 8, 2017.

FIELD OF THE INVENTION

This invention relates to methods and systems for three-dimensional video processing, for example in virtual reality applications.

BACKGROUND OF THE INVENTION

Virtual reality (VR) is a rapidly developing area of technology in which video content is provided, e.g. streamed, to a VR display system. A VR display system may be provided with a live or stored feed from a video content source, the feed representing a VR space or world for immersive output through the display system. In some embodiments, audio is provided, which may be spatial audio. A virtual space or virtual world is any computer-generated version of a space, for example a captured real world space, in which a user can be immersed through a display system such as a VR headset. A VR headset may be configured to provide VR video and audio content to the user, e.g. through the use of a pair of video screens and headphones incorporated within the headset.

The VR feed may comprise data representing a plurality of frames of three-dimensional (3D) video content which provides a 3D representation of a space and/or objects which appear to have depth when rendered to the VR headset. The 3D video content may comprise a colour (e.g. RGB) stream and a corresponding depth stream indicating the depth information for different parts of the colour stream.

Position and/or movement of the user device can enhance the immersive experience. VR headsets use so-called three degrees of freedom (3DoF) which means that the head movement in the yaw, pitch and roll axes are measured and determine what the user sees. This facilitates the scene remaining largely static in a single location as the user rotates their head. A next stage may be referred to as 3DoF+, which may facilitate limited translational movement in Euclidean space in the range of, e.g. tens of centimetres, around a location. A yet further stage is a six degrees of freedom (6DoF) VR system, where the user is able to freely move in the Euclidean space and rotate their head in the yaw, pitch and roll axes. 6DoF VR systems and methods will enable the provision and consumption of volumetric VR content.

Volumetric VR content comprises data representing spaces and/or objects in three-dimensions from all angles, enabling the user to move fully around the spaces and/or objects to view them from any angle. For example, a person or object may be fully scanned and reproduced within a real-world space. When rendered to a VR headset, the user may 'walk around' the person or object and view them from the front, the sides and from behind.

SUMMARY OF THE INVENTION

A first aspect of the invention provides a method comprising: receiving first video data representing three-dimensional video content arranged as a plurality of first tiles associated with respective sub-areas of an image; providing data indicating for each first tile a depth range of video content within said tile; determining for each first tile a respective volume based on the depth range; determining a field of view of a user in relation to the first tile volumes; and rendering of the first video data for one or more first tiles only if their determined volume is at least partially within the field of view.

The method may further comprise providing one or more screen tiles associated with the rendering of the first video data; identifying one or more screen tiles having invalid pixel data; receiving second video data representing the three-dimensional video content captured from a different location than the first video data, the second video data being arranged as one or more second tiles; identifying one or more second tiles corresponding to at least some of the screen tiles having invalid pixel data; and rendering the identified second tile pixel data.

The method may further comprise providing data indicating for each of the second tiles a depth range of video content within said second tile(s), determining for each second tile a respective volume based on the depth range, and wherein the one or more second tiles volumes are projected onto the screen tiles, and are identified as corresponding to the screen tiles having invalid pixel data if their volume covers said screen tiles having invalid pixel data.

The first and second video data may represent first and second layers of the video content respectively.

The first video data may represent a foreground layer and the second video data may represent a first background layer.

The method may further comprise providing one or more screen tiles after rendering the second tile set; identifying one or more screen tiles having invalid pixel data; receiving third video data representing a third layer of the video content, behind the second layer, the third video data being arranged as one or more third tiles; identifying one or more third tiles corresponding to at least some of the screen tiles having invalid pixel data; and rendering the identified third tile pixel data.

The provided depth range data may be received metadata.

The provided depth range data may be generated locally, substantially in real-time.

The depth range data may indicate the minimum and maximum depth values of video content within said tile.

The field of view may be a view frustum projected from the position of the user towards the video content.

The position of the user may be determined based on positional data received from a user device.

The user device may be a virtual reality headset.

The video data may comprise graphics data and depth data associated with the graphics data.

The video content may represent a panoramic image.

The video content may represent a virtual space.

Rendering may be initiated by a single draw call.

The one or more screen tiles may be provided after the draw call.

Rendering may be performed by a graphics processing unit and remaining operations by a central processing unit.

A further aspect of the invention provides computer program comprising instructions that when executed by a computer control it to perform the method of any preceding method definition.

A further aspect of the invention provides an apparatus configured to perform the method steps of any of preceding method definition.

A further aspect of the invention provides a non-transitory computer-readable medium having stored thereon computer-readable code, which, when executed by at least one processor, causes the at least one processor to perform a method, comprising: receiving first video data representing three-dimensional video content arranged as a plurality of first tiles associated with respective sub-areas of an image; providing data indicating for each first tile a depth range of video content within said tile; determining for each first tile a respective volume based on the depth range; determining a field of view of a user in relation to the first tile volumes; and rendering of the first video data for one or more first tiles only if their volume is at least partially within the field of view.

A further aspect of the invention provides an apparatus, the apparatus having at least one processor and at least one memory having computer-readable code stored thereon which when executed controls the at least one processor: to receive first video data representing three-dimensional video content arranged as a plurality of first tiles associated with respective sub-areas of an image; to provide data indicating for each first tile a depth range of video content within said tile; to determine for each first tile a respective volume based on the depth range; to determine a field of view of a user in relation to the first tile volumes; and to render of the first video data for one or more first tiles only if their volume is at least partially within the field of view.

Further, optional, features of the apparatus are defined in the dependent claims.

BRIEF DESCRIPTION OF THE DRAWINGS

The invention will now be described, by way of non-limiting example, with reference to the accompanying drawings, in which:

FIG. 3 is a side view of a multi-camera device for capturing panoramic images;

FIG. 4 is a schematic diagram of an example VR capture scenario and a content provider system, according to embodiments of the invention;

FIG. 11 is a flow diagram showing processing steps performed at the media player of FIG. 10, according to embodiments of the invention;

FIG. 12 is a flow diagram showing further processing steps performed at the media player of FIG. 10, according to embodiments of the invention;

FIG. 13 is a flow diagram showing processing steps that may be performed in one stage of the FIG. 12 method;

DETAILED DESCRIPTION OF PREFERRED EMBODIMENTS

Embodiments herein relate to processing video content, particularly three-dimensional (3D) video content. For example, the 3D video content may be virtual reality (VR) video content, representing a plurality of frames of VR data for output to a VR headset or a similar display system. The 3D video content may represent panoramic video content.

Such methods and systems are applicable to related technologies, including Augmented Reality (AR) technology and panoramic video technology.

Video content is represented by video data in any format. The video data may be captured and provided from any image sensing apparatus, for example a single camera or a multi-camera device, e.g. Nokia's OZO camera. The methods and systems described herein are applicable to video content captured by, for example, monoscopic cameras, stereoscopic cameras, 360 degree panoramic cameras, omni-directional cameras and other forms of VR or AR camera.

In some embodiments, the video data may be stored remotely from the one or more users, and streamed to users over a network. The network may be an IP network such as the Internet. The video data may be stored local to the one or more users on a memory device, such as a hard disk drive (HDD) or removable media such as a CD-ROM, DVD or memory stick. Alternatively, the video data may be stored remotely on a cloud-based system.

In embodiments described herein, the video data is stored remotely from one or more users at a content server. The video data is streamed over an IP network to a display system associated with one or more users. The stream of the video data may represent one or more VR spaces or worlds for immersive output through the display system. In some embodiments, audio may also be provided, which may be spatial audio.

Figure 1:
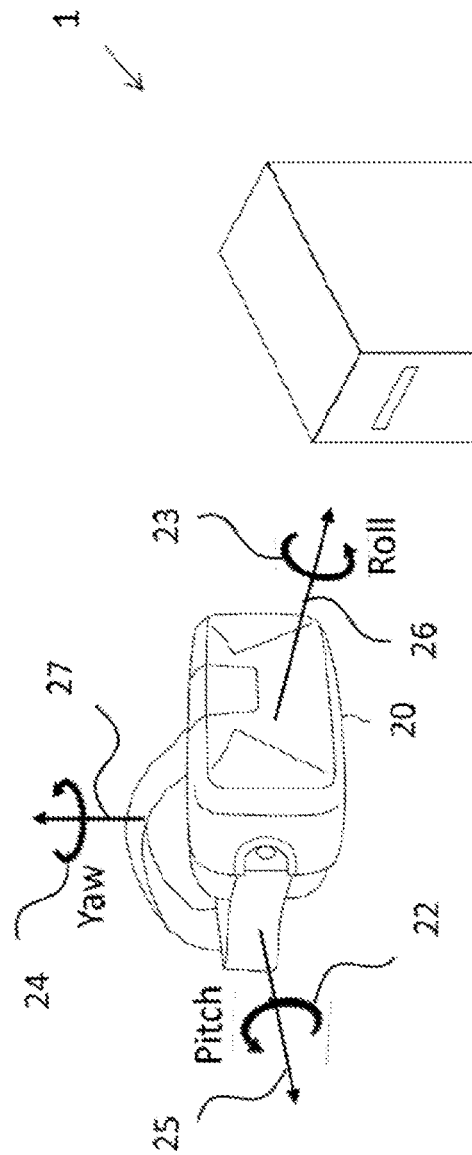
FIG. 1 is a perspective view of a VR display system.

FIG. 1 is a schematic illustration of a VR display system 1 which represents user-end equipment. The VR display system 1 includes a user device in the form of a VR headset 20 for displaying video data representing a VR space, and a VR media player 10 for rendering the video data on the VR headset 20. In some embodiments, a separate user control (not shown) may be associated with the VR display system 1, e.g. a hand-held controller.

In the context of this specification, a virtual space or world is any computer-generated version of a space, for example a captured real world space, in which a user can be immersed. It may comprise one or more objects. The VR headset 20 may be of any suitable type. The VR headset 20 may be configured to provide VR video and audio content data to a user. As such, the user may be immersed in virtual space.

The VR headset 20 receives the VR video data from a VR media player 10. The VR media player 10 may be part of a separate device which is connected to the VR headset 20 by a wired or wireless connection. For example, the VR media player 10 may include a games console, or a PC configured to communicate video and/or audio data to the VR headset 20.

Alternatively, the VR media player 10 may form part of the VR headset 20.

Here, the VR media player 10 may comprise a mobile phone, smartphone or tablet computer configured to play content through its display. For example, the VR media player 10 may be a touchscreen device having a display over a major surface of the device, through which video content can be displayed. The VR media player 10 may be inserted into a holder of a VR headset 20. With such VR headsets 20, a smart phone or tablet computer may display the video data which is provided to a user's eyes via respective lenses in the VR headset 20. The VR display system 1 may also include hardware configured to convert the device to operate as part of VR display system 1. Alternatively, the VR media player 10 may be integrated into the VR headset 20. The VR media player 10 may be implemented in software, hardware, firmware or a combination thereof. In some embodiments, a device comprising VR media player software is referred to as the VR media player 10.

The VR display system 1 may include means for determining the spatial position of the user and/or orientation of the user's head. This may be by means of determining the spatial position and/or orientation of the VR headset 20. Over successive time frames, a measure of movement may therefore be calculated and stored. Such means may comprise part of the VR media player 10. Alternatively, the means may comprise part of the VR headset 20. For example, the VR headset 20 may incorporate motion tracking sensors which may include one or more of gyroscopes, accelerometers and structured light systems. These motion tracking sensors generate position data from which a current visual field-of-view (FOV) is determined and updated as the user, and so the VR headset 20, changes position and/or orientation. The VR headset 20 will typically comprise two digital screens for displaying stereoscopic video images of the virtual world in front of respective eyes of the user, and also two speakers for delivering audio, if provided from the VR media player 10. The embodiments herein, which primarily relate to the delivery of VR content, are not limited to a particular type of VR headset 20.

In some embodiments, the VR display system 1 may include means for determining the gaze direction of the user. In some embodiments, gaze direction may be determined using eye tracking sensors provided in the VR headset 20. The eye tracking sensors may, for example, be miniature cameras installed proximate the video screens which identify in real-time the pupil position of each eye. The identified positions may be used to determine which part of the current visual FOV is of interest to the user. This information can be used for example to identify one or more sub-sets of content within the video data, e.g. objects or regions projected at a particular depth within the content. For example, the convergence point of both eyes may be used to identify a reference depth.

The VR display system 1 may be configured to display VR video data to the VR headset 20 based on spatial position and/or the orientation of the VR headset. A detected change in spatial position and/or orientation, i.e. a form of movement, may result in a corresponding change in the visual data to reflect a position or orientation transformation of the user with reference to the space into which the visual data is projected. This allows VR video data to be consumed with the user experiencing a stereoscopic or 3D VR environment.

Audio data may also be provided to headphones provided as part of the VR headset 20. The audio data may represent spatial audio source content. Spatial audio may refer to directional rendering of audio in the VR space or world such that a detected change in the user's spatial position or in the orientation of their head may result in a corresponding change in the spatial audio rendering to reflect a transformation with reference to the space in which the spatial audio data is rendered.

The angular extent of the environment observable through the VR headset 20 is called the visual field of view (FOV). The actual FOV observed by a user depends on the inter-pupillary distance and on the distance between the lenses of the VR headset 20 and the user's eyes, but the FOV can be considered to be approximately the same for all users of a given display device when the VR headset is being worn by the user.

In 3D video, a view frustum refers to the region of space in the 3D world that may appear on screen, it is the FOV of the notional camera.

Figure 2:
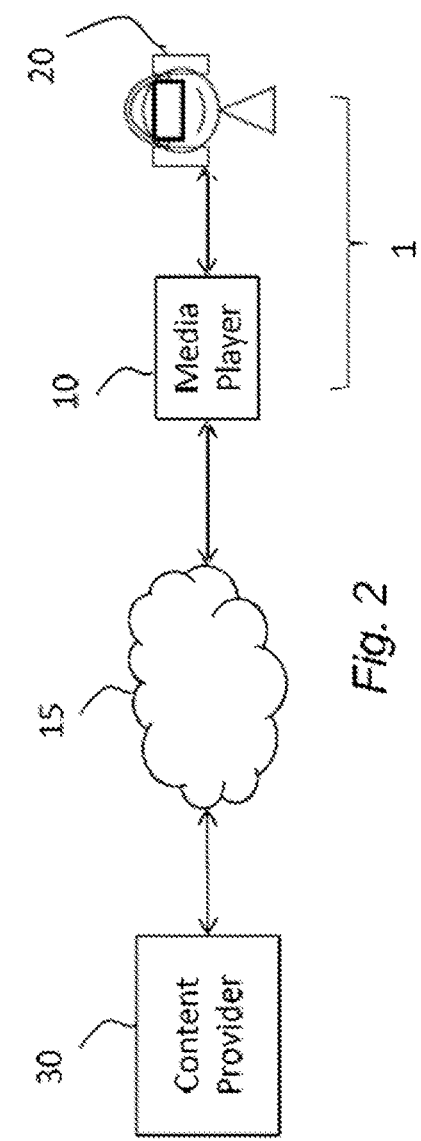
FIG. 2 is a block diagram of a computer network including the FIG. 1 VR display system, according to embodiments of the invention.

Referring to FIG. 2, a remote content provider 30 may store and transmit streaming VR video data for output to the VR headset 20. Responsive to receive or download requests sent by the VR media player 10, the content provider 30 streams the video data over a data network 15, which may be any network, for example an IP network such as the Internet.

The remote content provider 30 may or may not be the location or system where the VR video is captured, created and/or processed.

For illustration purposes, we may assume that the content provider 30 also captures, encodes and stores the VR content.

Referring to FIG. 3, an example VR capturing device is in the form of a multi-camera system 31. The multi-camera system 31 comprises a generally spherical body 32 around which are distributed a plurality of video cameras 33. For example, eight video cameras 33 may be provided, each having an approximate 195° field-of-view. The multi-camera system 31 may therefore capture 360° panoramic images by stitching images from the individual cameras 33 together, taking into account overlapping regions. Nokia's OZO camera is one such example. Multiple microphones (not shown) may also be distributed around the body 32 for capturing spatial audio.

Referring to FIG. 4, an overview of a VR capture scenario 34 is shown. The VR capture scenario 34 is shown together with a system associated with the content provider 30, which comprises a post-processing module 35 and an associated user interface 44. FIG. 4 shows in plan-view a real world space 36 which may be an indoors scene, an outdoors scene, a concert, a conference or indeed any real-world situation. The multi-camera system 31 may be supported on a floor 37 of the real-world space 36 in front of first to fourth objects 38, 39, 40, 41. The first to fourth objects 38, 39, 40, 41 may be static objects or they may move over time. One or more of the first to fourth objects 38, 39, 40, 41 may be a person, an animal, a natural or geographic feature, an inanimate object, a celestial body etc. One or more of the first to fourth objects 38, 39, 40, 41 may generate audio, e.g. if the object is a singer, a performer or a musical instrument. A greater or lesser number of objects may be present.

The position of the multi-camera system 31 may be known, e.g. through predetermined positional data or signals derived from a positioning tag on the VR capture device.

One or more of the first to fourth objects 38, 39, 40, 41 may carry a positioning tag. A positioning tag may be any module capable of indicating through data its respective spatial position to the post-processing module 35. For example a positioning tag may be a high accuracy indoor positioning (HAIP) tag which works in association with one or more HAIP locators within the space 36. HAIP systems use Bluetooth Low Energy (BLE) communication between the tags and the one or more locators. For example, there may be four HAIP locators mounted on, or placed relative to, the multi-camera system 31. A respective HAIP locator may be to the front, left, back and right of the multi-camera system 31. Each tag sends BLE signals from which the HAIP locators derive the tag, and therefore, audio source location.

In general, such direction of arrival (DoA) positioning systems are based on (i) a known location and orientation of the or each locator, and (ii) measurement of the DoA angle of the signal from the respective tag towards the locators in the locators' local co-ordinate system. Based on the location and angle information from one or more locators, the position of the tag may be calculated using geometry.

The position of the first to fourth objects 38, 39, 40, 41 may be determined using a separate camera system.

In addition to the multi-camera system 31, there may be provided one or more further cameras. For example, a second multi-camera system 52 is provided in a second location, and a third, monoscopic camera system 53 is provided in a third location. The FOV of the respective camera systems 31, 52, 53 may overlap to some extent in the real world space 36.

The post-processing module 35 is a processing system, possibly having an associated user interface (UI) 44 which may be used for example by an engineer or mixer to monitor, modify and/or control any aspect of the captured video and/or audio. Embodiments herein also enable provision and editing of control data for association with captured video data to enable one or more occluded regions to be represented, as will be explained later on.

As shown in FIG. 4, the post-processing module 35 receives as input from the multi-camera system 31 spatial video data (and possibly audio data) and positioning data, through a signal line 42. Alternatively, the positioning data may be received from a HAIP locator. The post-processing module 35 may also receive as input from one or more of the first to fourth objects 38, 39, 40, 41 audio data and positioning data from respective positioning tags through separate signal lines.

The post-processing module 35 may also receive as input separate video data from each of the second and third video cameras 52, 53.

The post-processing module 35 generates and stores the video and audio data for output to a user device, such as the VR system 1 shown in FIGS. 1 and 2, via a signal line 47.

The input audio data may be multichannel audio in loudspeaker format, e.g. stereo signals, 4.0 signals, 5.1 signals, Dolby Atmos® signals or the like. Instead of loudspeaker format audio, the input may be in the multi microphone signal format, such as the raw eight signal input from the Nokia OZO® VR camera, if used for the multi-camera system 31. The microphone signals can then be rendered to loudspeaker or binaural format for playback.

Associated with the post-processing module 35 is a streaming system 43, for example a streaming server. The streaming system 43 may be part of, or an entirely separate system from, the post-processing module 35. Signal line 45 indicates an input received over the network 15 from the VR system 1. The VR system 1 indicates through such signalling the data to be streamed dependent on position and/or orientation of the VR display device 20.

It will be appreciated that the video data captured by the multi-camera system 31 may represent objects positioned at different respective distances from the multi-camera system. For example, the first, second and third objects 38, 39, 40 are located at different respective distances $d_1$, $d_2$, $d_3$ from the multi-camera system 31.

The video data representing the first, second and third objects 38, 39, 40, which are visible to the multi-camera system 31, may be encoded in a first layer of the video content. This may be termed the foreground layer.

The fourth object 41 is located behind the first object 38 and hence is occluded from the multi-camera system 31. Therefore, the first or foreground layer captured by the multi-camera system 31 will not include any representation of the fourth object 41.

Figure 5:
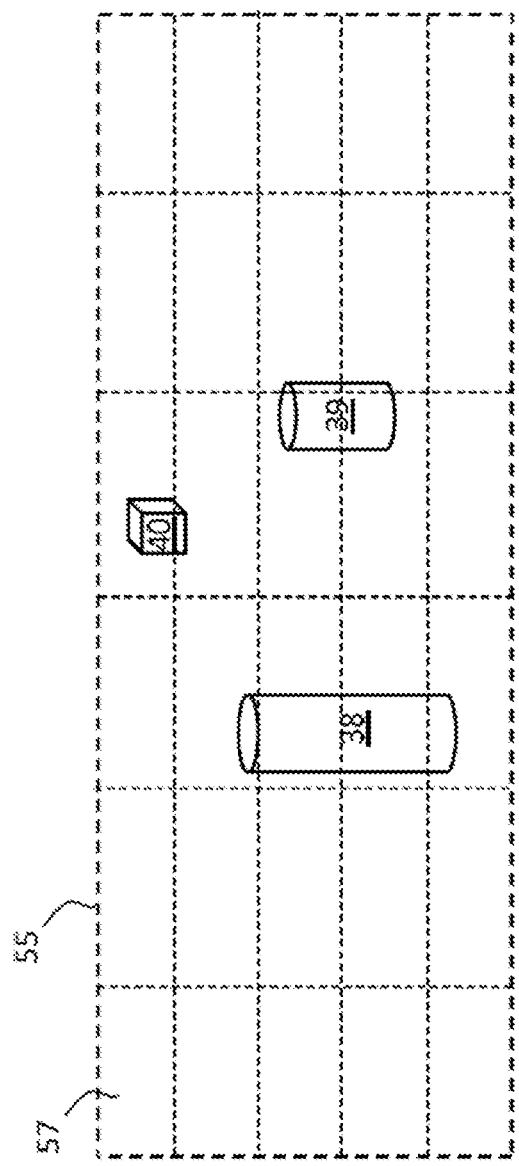
FIG. 5 is a representational view of one frame of panoramic video resulting from the FIG. 4 scenario.

The video data for the foreground layer may subsequently be processed so that the rendered video data, when output to the VR display device 20, simulates the captured foreground content at the respective depth planes. That is, when processed into stereoscopic video data (with slightly differing images being provided to the respective screens of the VR display device 20) the first to third objects 38, 39, 40 will appear at to be at their respective distances $d_1$, $d_2$, $d_3$ from the user's perspective. This is illustrated graphically in FIG. 5, which shows a single frame 55 of panoramic content based on the FIG. 4 scenario 34.

The video data for the foreground layer is arranged as a plurality of first tiles 57, each tile being associated with a respective sub-area of the frame 55. The first tiles 57 can be transmitted and processed separately, so that only tiles relevant to the user's current FOV may be transmitted and processed. In the shown example, each first tile 57 is rectangular in shape. The first tiles 57 can however be of any shape and size. In practice, there may be a significantly greater number of first tiles which are smaller in size.

The first tiles 57 represent areas for analysis, to be described below, in particular for disregarding or culling one or more of the first tiles prior to rendering the actual pixel data within the tiles.

Screen tiles represent respective pixels or groups of pixels actually displayed to the VR headset 20.

In a 6DoF system, if the user moves away from the centre of the scene, they will see invalid pixel data corresponding to the 3D position of the fourth object 41. One or more further layers, usually termed background layers, may be captured and encoded using the second and third cameras 52, 53. The one or more background layers may also be transmitted as one or more tiles, e.g. second tiles may transmitted for a first background layer and third tiles may be transmitted for a third background layer and so on. The number of tiles encoded for the background layer(s) may be of a different number and/or size. For example, a first background layer may be encoded with fewer tiles.

As with the first tiles 57, the second and third tiles are metadata tiles used for analysis and each has associated pixel data which are rendered to the screen dependent on the analysis.

By streaming video data representing the further layer(s), the invalid pixel data 'gaps' in the rendered screen tiles can be filled-in at the VR display system 1 based on the user's position and FOV. This requires extra data to be transmitted and processed.

Figure 6:
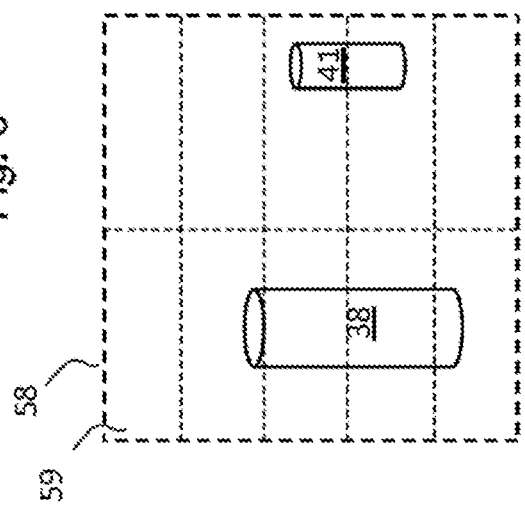
FIG. 6 is a representational view of a frame of video, captured by a different camera.

FIG. 6 shows an image frame 58 captured by the third camera 53, which captures the first and fourth objects 38, 41. The image frame 58 is similarly arranged as a plurality of second tiles 59.

For each tile 57, 59 of the foreground and the background layers, the post-processing module 35 is arranged to generate first and second data sets respectively comprising the colour information of the tile, and associated depth information indicative of the respective depths of pixels or pixel regions of said tile. Using this information, the VR display system 1 can render and display the pixel data of layers.

For example, the first data set may comprise RGB video data. The second data set may comprise depth information D for the pixel data in any conventional format. The depth information D may be generated using any known method, for example using a LiDAR sensor to generate a two-dimensional depth map. Alternatively, a depth map may be generated using a stereo-pair of images.

In the shown example, the depth information D may include data representative of $d_1$, $d_2$, $d_3$ shown in FIG. 4, as well as other depth information for other pixels of the foreground video content.

The first and second data sets RGB and D are provided in a form suitable for streaming on a frame-by-frame basis by the streaming system 43. For example, the first and second data sets may be termed RGB-D data sets, a term used in some known systems. The first and second data sets may be streamed simultaneously.

In embodiments herein, a set of metadata is generated at the post-processing module 35 for each foreground and background tile 57, 59.

The metadata indicates the range of pixel depths D within each tile 57, 59. For example, the metadata may indicate the minimum and maximum depths $D_{min}$, $D_{max}$ of the RGB data within each tile 57, 59.

As will be explained in further detail below, the metadata may be transmitted to the VR display system 1 and used prior to a subsequent rendering stage in order to avoid rendering tiles 57, 59 lying completely outside of a viewing frustum, estimated and projected from the user's current position in the VR space. The metadata may comprise a relatively small amount of additional or augmenting data, and may be used to limit the amount of data that needs to be rendered by the VR display system 1. The processing resources of the VR display system 1 are therefore used more efficiently.

Metadata may be associated with each frame of the video data.

Figure 7:
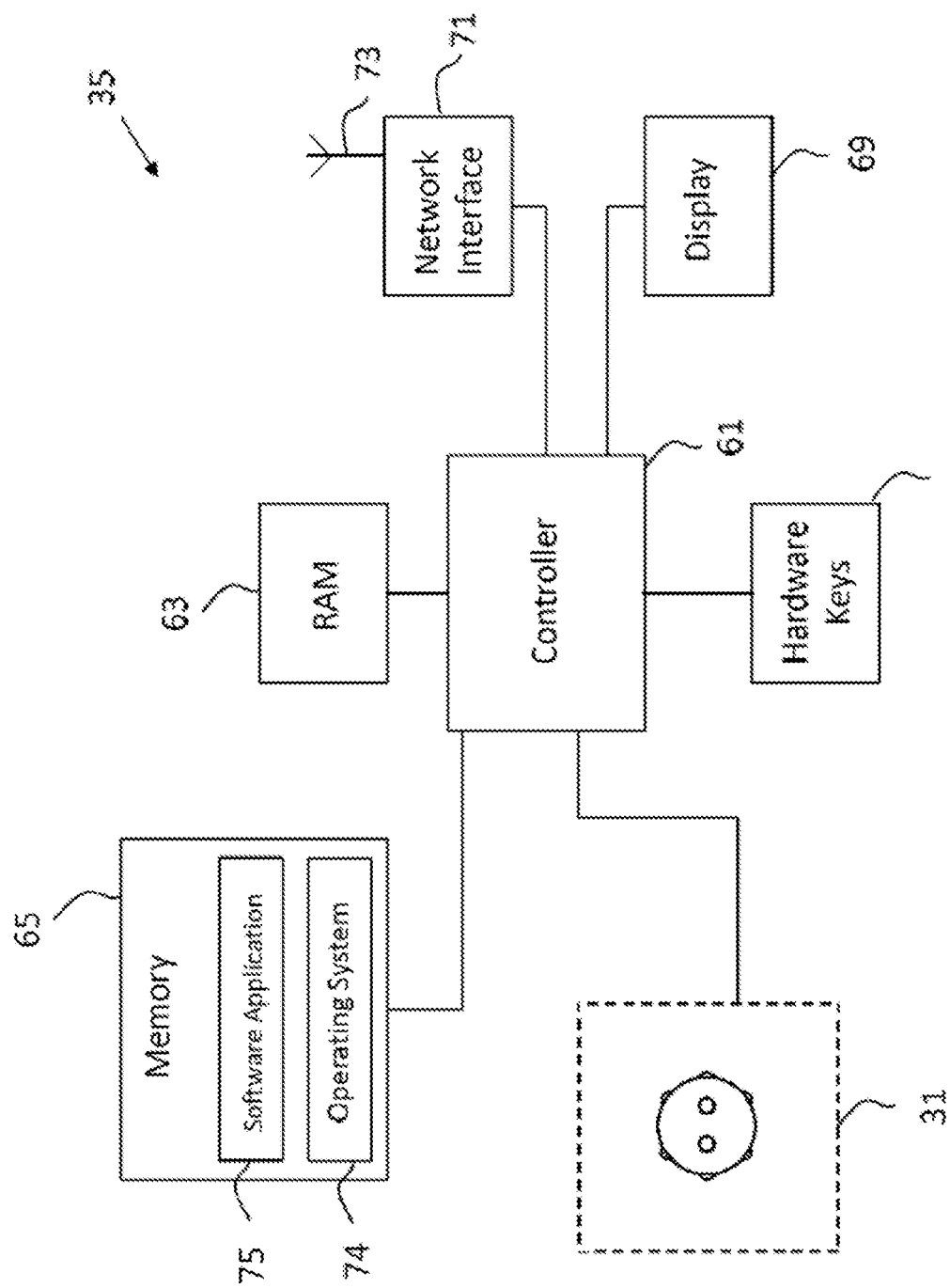
FIG. 7 is a schematic diagram of components of a content provider system shown in FIG. 4.

Referring to FIG. 7, components of the post-processing module 35 are shown. The post-processing module 35 may comprise a controller 61, RAM 63, a memory 65, and, optionally, hardware keys 67 and a display 69. The post-processing module 35 may comprise a network interface 71, which may be a data port for connecting the system to the network 15 or the streaming module 43.

The network interface 71 may additionally or alternatively comprise a radiofrequency wireless interface for transmitting and/or receiving the post-processed data using a wireless communications protocol, e.g. WiFi or Bluetooth. An antenna 73 may be provided for this purpose.

The controller 61 may receive captured RGB video data from the multi-camera system 31. The controller 61 may also receive depth information, e.g. a depth map. A depth map may associated with successive frames of the video data.

One or more control signals may be provided from the controller 61 to the multi-camera system 31.

The controller 61 may also receive captured RGB video data from the second and/or third camera system 52, 53. The controller 61 may also receive depth information, e.g. a depth map. A depth map may be associated with successive frames.

The memory 65 may be a non-volatile memory such as read only memory (ROM), a hard disk drive (HDD) or a solid state drive (SSD). The memory 65 stores, amongst other things, an operating system 74 and may store software applications 75. The RAM 63 is used by the controller 61 for the temporary storage of data. The operating system 74 may contain code which, when executed by the controller 61 in conjunction with the RAM 63, controls operation of each of the hardware components of the post-processing system 35.

The controller 61 may take any suitable form. For instance, it may be a microcontroller, plural microcontrollers, a processor, or plural processors.

In some embodiments, the post-processing system 35 may also be associated with external software applications not stored on the camera. These may be applications stored on a remote server device and may run partly or exclusively on the remote server device. These applications may be termed cloud-hosted applications.

Figure 8:
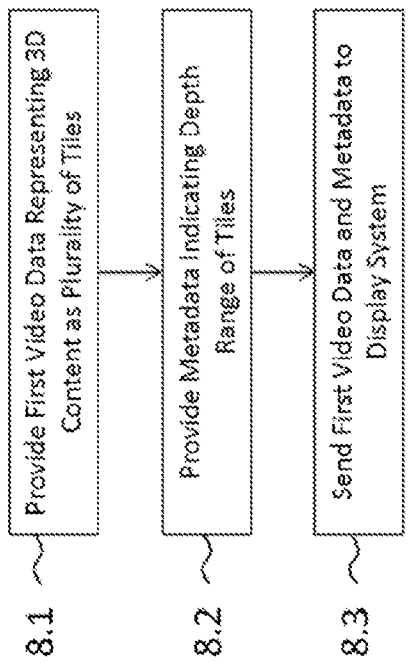
FIG. 8 is a flow diagram showing processing steps performed at the content provider system of FIG. 4, according to embodiments of the invention.

FIG. 8 is a flow diagram indicating steps performed by one or more software applications in accordance with embodiments. For example, FIG. 8 may represent steps performed by the software application 75 in FIG. 7, which is a post-processing application. It should be appreciated that certain ones of the steps shown in FIG. 8 can be re-ordered. The numbering of steps is not necessarily indicative of their required order of processing.

In a first step 8.1, first video data is provided and represented as a plurality of tiles 57. In another step 8.2, metadata is provided for each of the tiles 57 indicative of the range of depths, e.g. by indicating the minimum and maximum depth values $D_{min}$, $D_{max}$. In some cases, mentioned below, the metadata may not be provided by the software application 75 and is instead derived at the media player 10. Steps 8.1 and 8.2 may be performed in reverse order or at the same time. In another step 8.3, the first video data and the metadata is sent to a display system, e.g. the VR display system 1. This may be by means of streaming, which may be performed for both data sets simultaneously.

The first video data represents the foreground layer. The steps 8.1-8.3 may also be performed for the second (and/or third) video data, representing one or more background layers. The steps 8.1-8.3 may be performed in parallel or in sequence for the different layers.

Figure 9:
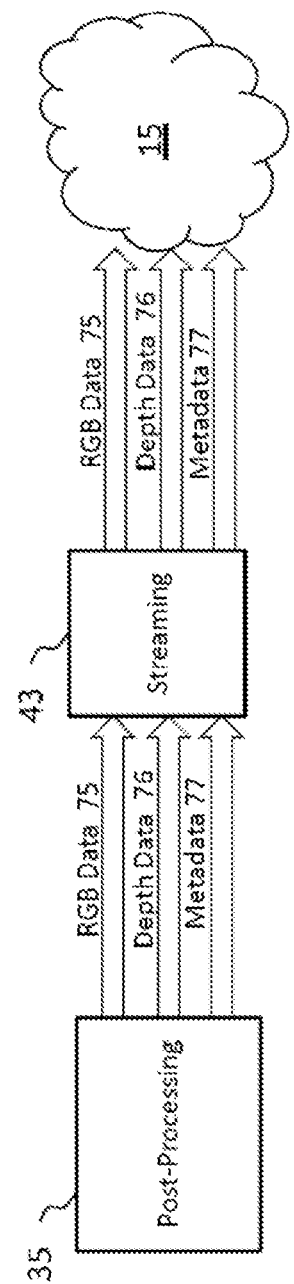
FIG. 9 is a schematic diagram showing part of the FIG. 4 content provider system and different streams of data, according to embodiments of the invention.

FIG. 9 shows the post-processing module 35, the streaming module 43 and the separate streams of RGB data 75, depth data 76 and metadata 77 being transmitted to the VR display system 1 via the network 15 shown in FIG. 1.

Figure 10:
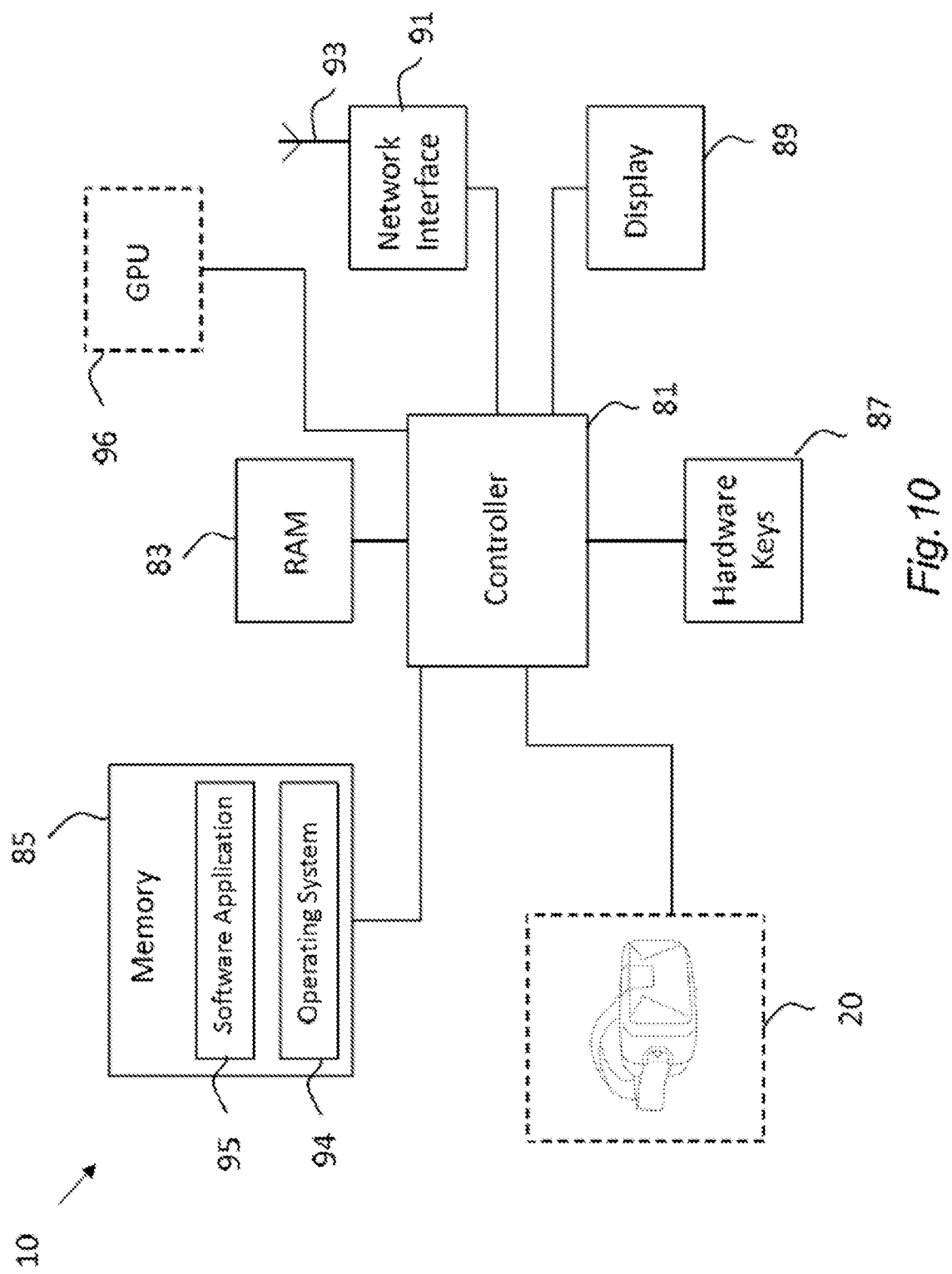
FIG. 10 is a schematic diagram of components of a media player shown in FIG. 2.

Referring to FIG. 10, components of the media player 10 at the VR display system 1 are shown. The media player 10 may comprise a controller 81, RAM 83, a memory 85, and, optionally, hardware keys 87 and a display 89. The media player 10 may comprise a network interface 91, which may be a data port for connecting the system to the network 15 or the streaming module 43.

The network interface 91 may additionally or alternatively comprise a radiofrequency wireless interface for transmitting and/or receiving the post-processed data using a wireless communications protocol, e.g. WiFi or Bluetooth. An antenna 93 may be provided for this purpose.

The controller 81 may receive via the network interface 91 the separate streams of RGB data 75, depth data 76 and metadata 77 for successive frames.

The controller 81 may transmit and receive information with the VR headset 20.

The memory 85 may be a non-volatile memory such as read only memory (ROM), a hard disk drive (HDD) or a solid state drive (SSD). The memory 85 stores, amongst other things, an operating system 94 and may store software applications 95. The RAM 83 is used by the controller 81 for the temporary storage of data. The operating system 94 may contain code which, when executed by the controller 81 in conjunction with the RAM 83, controls operation of each of the hardware components of the media player 10.

The controller 81 may take any suitable form. For instance, it may be a microcontroller, plural microcontrollers, a processor, or plural processors.

In some cases, a Graphics Processing Unit (GPU) 96 may be provided, connected to the controller 81. The GPU 96 may be used as a separate processor for rendering video data based on instructions received from the controller 81.

In some embodiments, the media player 10 may also be associated with external software applications. These may be applications stored on a remote server device and may run partly or exclusively on the remote server device. These applications may be termed cloud-hosted applications. The media player 10 may be in communication with the remote server device in order to utilize the software application stored there.

FIG. 11 is a flow diagram indicating steps performed by one or more software applications in accordance with embodiments. For example, FIG. 11 may represent steps performed by the software application 95 in FIG. 10, which is an application for receiving the above-mentioned first video data 75, 76 and the metadata 77 and for rendering video content to the VR headset 20.

It should be appreciated that certain ones of the steps shown in FIG. 11 can be re-ordered and/or omitted. The numbering of steps is not necessarily indicative of their required order of processing.

In a first step 11.1, the first video data representing the 3D content as a plurality of first tiles is received. In another step 11.2, the metadata indicating the depth range for each first tile is received. In some embodiments, the metadata is received from the content provider 30. In other embodiments, the metadata may be generated locally by the software application 95, substantially in real-time, from the depth information and provided to the subsequent stage. In this sense, the term 'receiving' may mean receiving the metadata from another local process. In another step 11.3, for each tile a respective volume is determined based on the depth range in the metadata. In another step 11.4, the FOV of a user is determined in relation to the first tile volumes determined in step 11.3. In another step 11.5, the first video data is rendered for one or more of the first tiles only if the volume of the first tiles is at least partially within the FOV determined in step 11.4.

This form of culling of the first tiles in terms of their volume (e.g. a cuboid) is appropriate and yields good results because 3D data is being processed.

FIG. 12 is a flow diagram indicating additional steps that may be performed by the software application 95 in some embodiments. In a first step 12.1, it is identified if one or more screen tiles comprise invalid pixel data after rendering the first tiles. A further step 12.2 comprises receiving second video data representing the 3D content as a plurality of second tiles. In another step 12.3, it is identified, from the one or more second tiles, tile volumes corresponding with at least some of the screen tiles with invalid pixel data. In another step 12.4, the identified second tile pixel data is rendered.

Invalid pixel data may refer to pixel positions in a tile which have no graphical data, e.g. no RGB and/or depth data, or any such data representing blank or non-content data.

The second tiles may represent a different layer than the first tiles. For example, the second tiles may represent a first background layer and the first tiles may represent a foreground layer.

Steps 12.1-12.4 may be repeated for a subsequent layer, e.g. a second background layer positioned behind the foreground layer and the first background layer, if invalid frames are present after rendering one or more second tiles.

In overview, the process of FIG. 11 provides a method of culling, or disregarding, first tiles based on a volumetric representation of each tile. Only those first tile volumes which fall at least partially within the FOV are rendered as an initial layer.

The process of FIG. 12 provides a method for filling-in invalid or invalid pixel data of the initial layer by using second tiles. The process of FIG. 13 provides a particular method of using only second tiles whose volume overlaps or corresponds to one or more of the screen tiles.

The above processes will now be explained using a particular graphical example.

Figure 14:
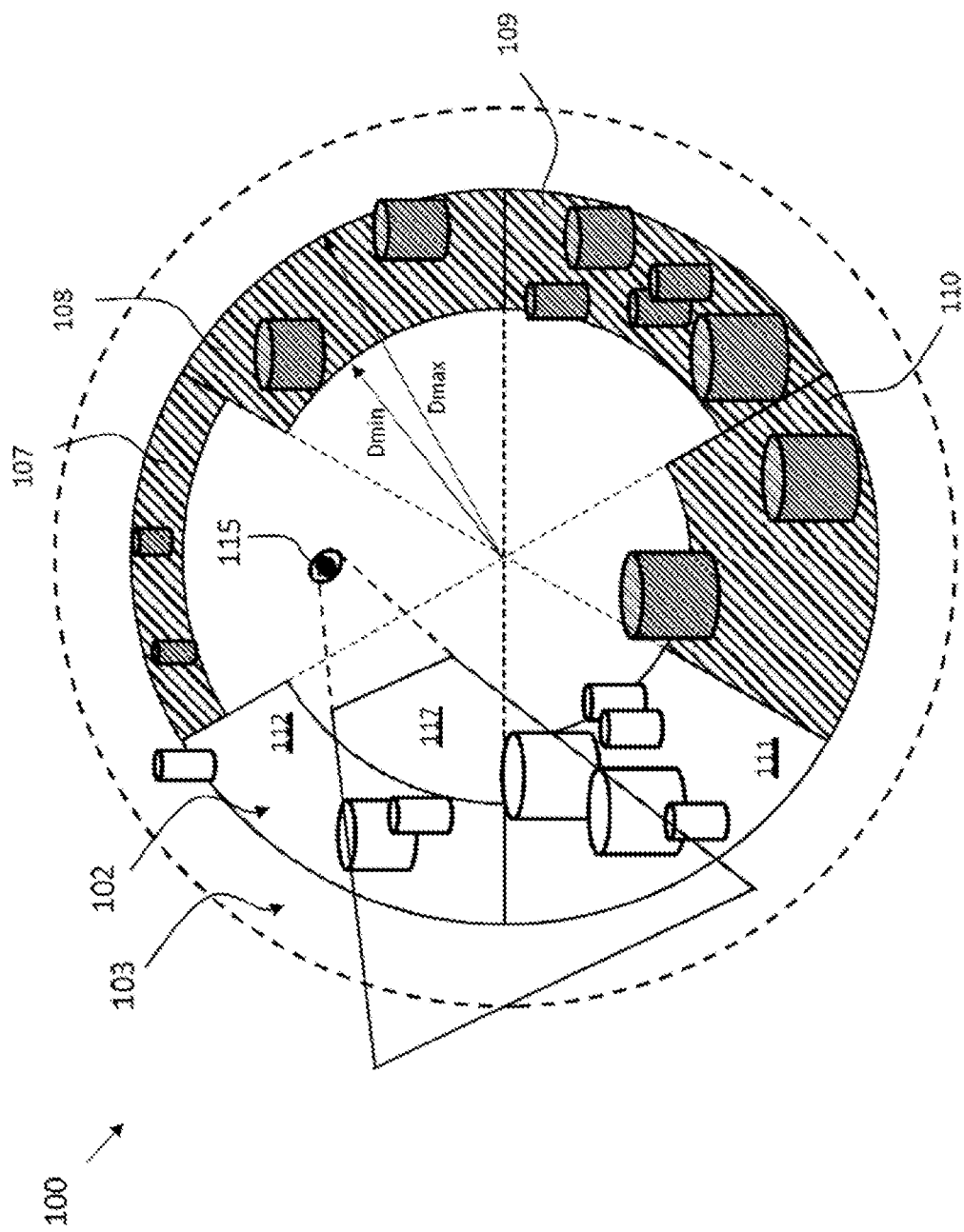
FIG. 14 is a representational view of a virtual world comprising multiple tiles of foreground content.

FIG. 14 is a plan, 2D view of an example 3D virtual world 100. The virtual world 100 is represented by first video data (RGB+D) representing a foreground layer 102 and second video data (RGB+D) representing a first background layer 103. FIG. 14 is concerned mainly with the foreground layer 102 which is shown comprising various graphical objects. Reference numeral 105 represents a capture location of the first multi-view camera 31.

The first video data represents the foreground layer 102 as a plurality of tiles 107-112. The number of tiles 107-112 is illustrative and, in reality, there may be hundreds or thousands of tiles. In accordance with step 11.2, metadata is received, indicating the values of $D_{min}$, $D_{max}$ for each of the tiles 107-112. In accordance with step 11.3, respective volumes (which may be referred to as cuboids) are projected based on the values of $D_{min}$, $D_{max}$ and possibly using intrinsic and extrinsic camera parameters of the video camera which generated the metadata.

In accordance with step 11.4, based on the position and orientation of a user 115 within the virtual world 100, a FOV 117 is determined. In 3D terms, the FOV 117 is a view frustum. It can, however, be of any volumetric shape.

In accordance with step 11.5, view frustum culling is performed by selecting only those first tile volumes at least partially within the FOV 117 or view frustum. This means that the first tiles 107-110 shown with hatching are disregarded from further processing. Only the two unhatched first tiles 111, 112 are selected and the corresponding first (RGB+D) data is rendered for output to the VR headset 20.

Rendering may be by means of issuing an indirect draw call to the Graphics Processing Unit (GPU) 96, if provided, in this case to render the list of potentially visible first tiles 111, 112.

Figure 15:
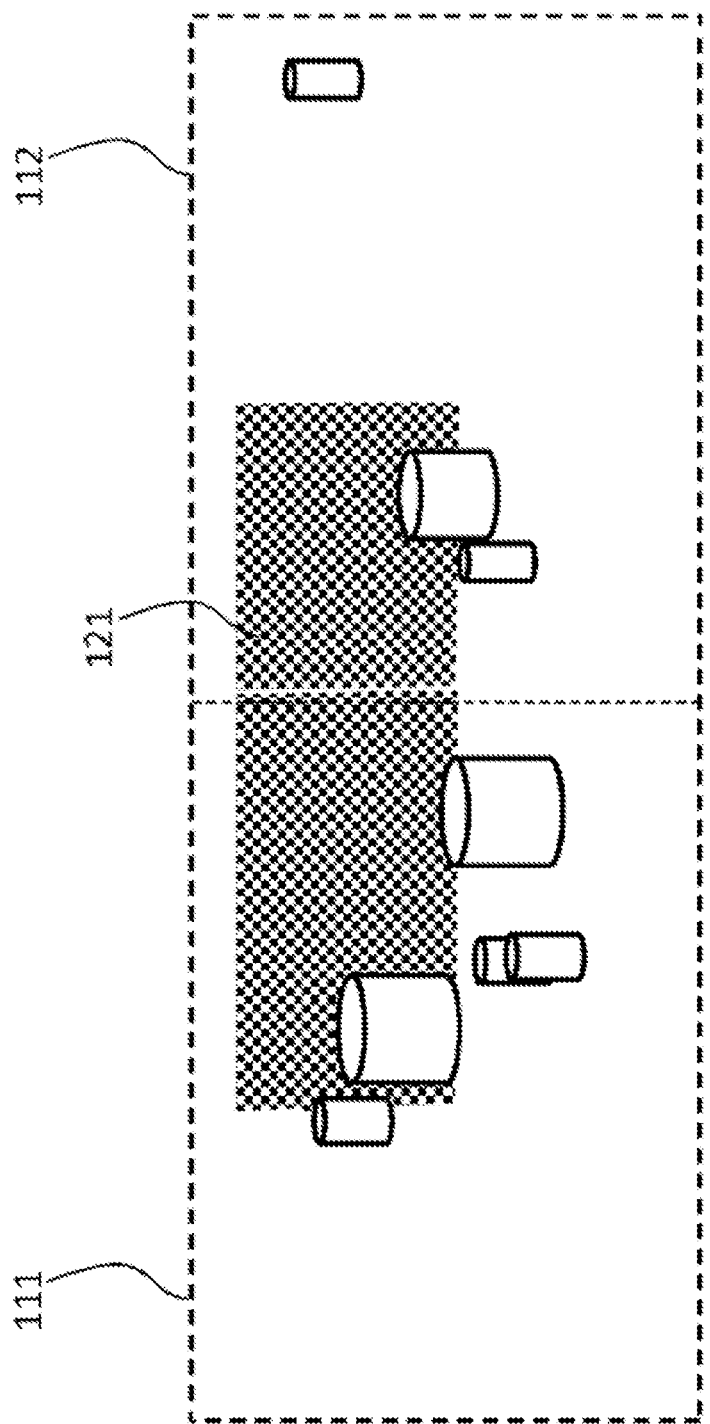
FIG. 15 is a representational view of rendered foreground content from a subset of the FIG. 14 tiles.

FIG. 15 shows the rendered foreground layer, comprising the two selected first tiles 111, 112 projected to screen. In this example, a shown region 121 of one or more screen tiles representing the pixel data is indicated; in other words, within these one or more screen tiles, there is pixel data not encoded in the foreground layer.

Screen tiles comprise of a region of multiple pixels represent with RGB+D data which is displayed to the VR headset 20.

Accordingly, in accordance with step 12.1, one or more screen tiles after rendering the first tiles 111, 112 are identified as having invalid pixel data.

In order to obtain valid data for the invalid pixel data, second video data corresponding to a first background layer 103 is obtained. From the second tile metadata, second tile volumes are projected and those which correspond to screen tiles having invalid pixel data is or are identified, and the other second tile volumes are disregarded. This may be termed "culling against tiles." From this, valid pixels corresponding to the foreground layer invalid pixels are rendered to screen. The background layer may be captured from one or more different camera locations than the foreground layer.

Figure 16:
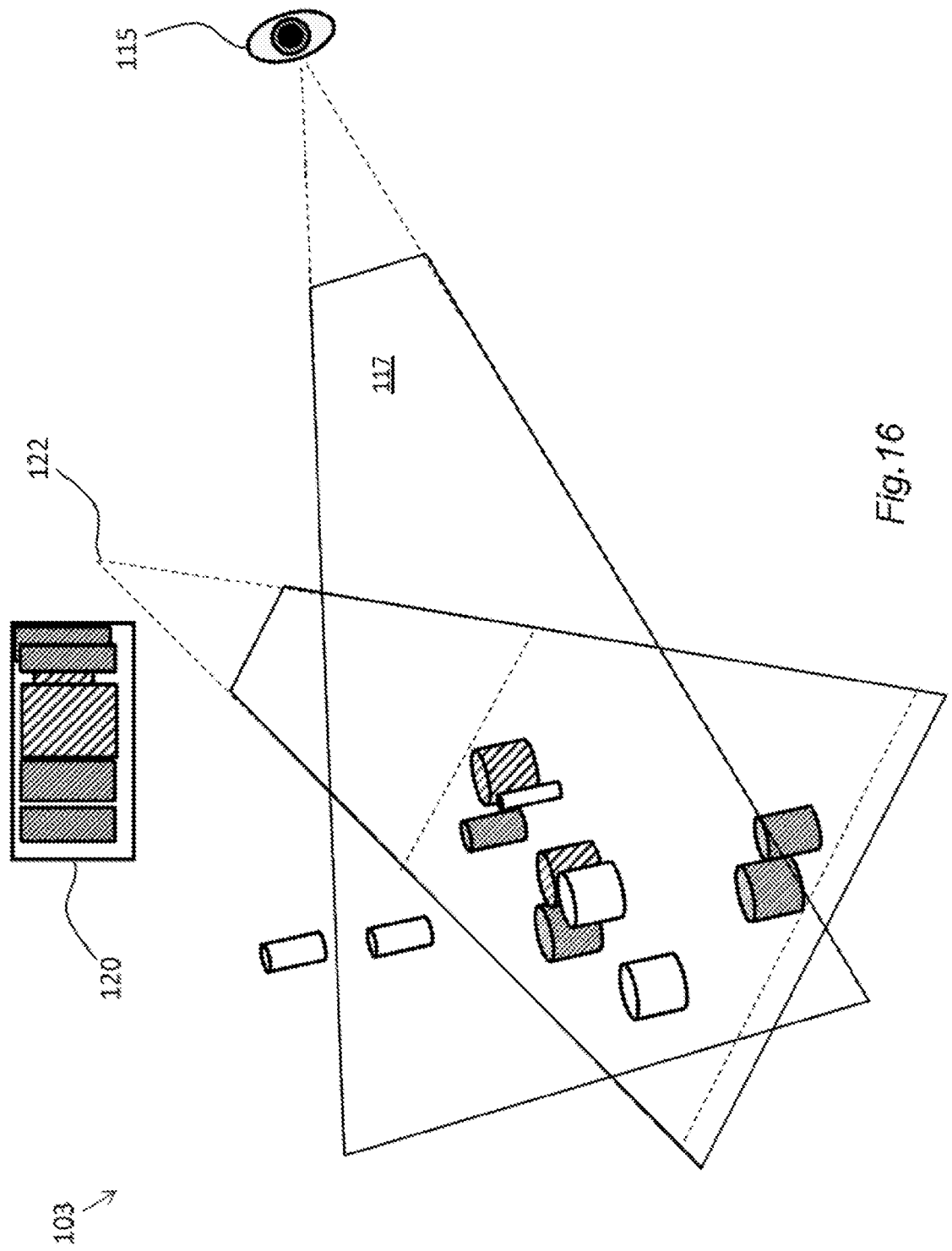
FIG. 16 is a representational view of part of the virtual world comprising multiple tiles of background content, in one stage.

For example, referring to FIG. 16, second video data represents the first background layer 103, which may comprise a number of further objects.

A second tile 120 may be determined based on the location of a different camera 122. The metadata for the shown second tile 120 indicates $D_{min}$, $D_{max}$ for the RGB+D second video data and the resulting volume falls within the FOV or frustum 117. It will be noted that none of the white objects are visible from the location of this camera 122.

Figure 17:
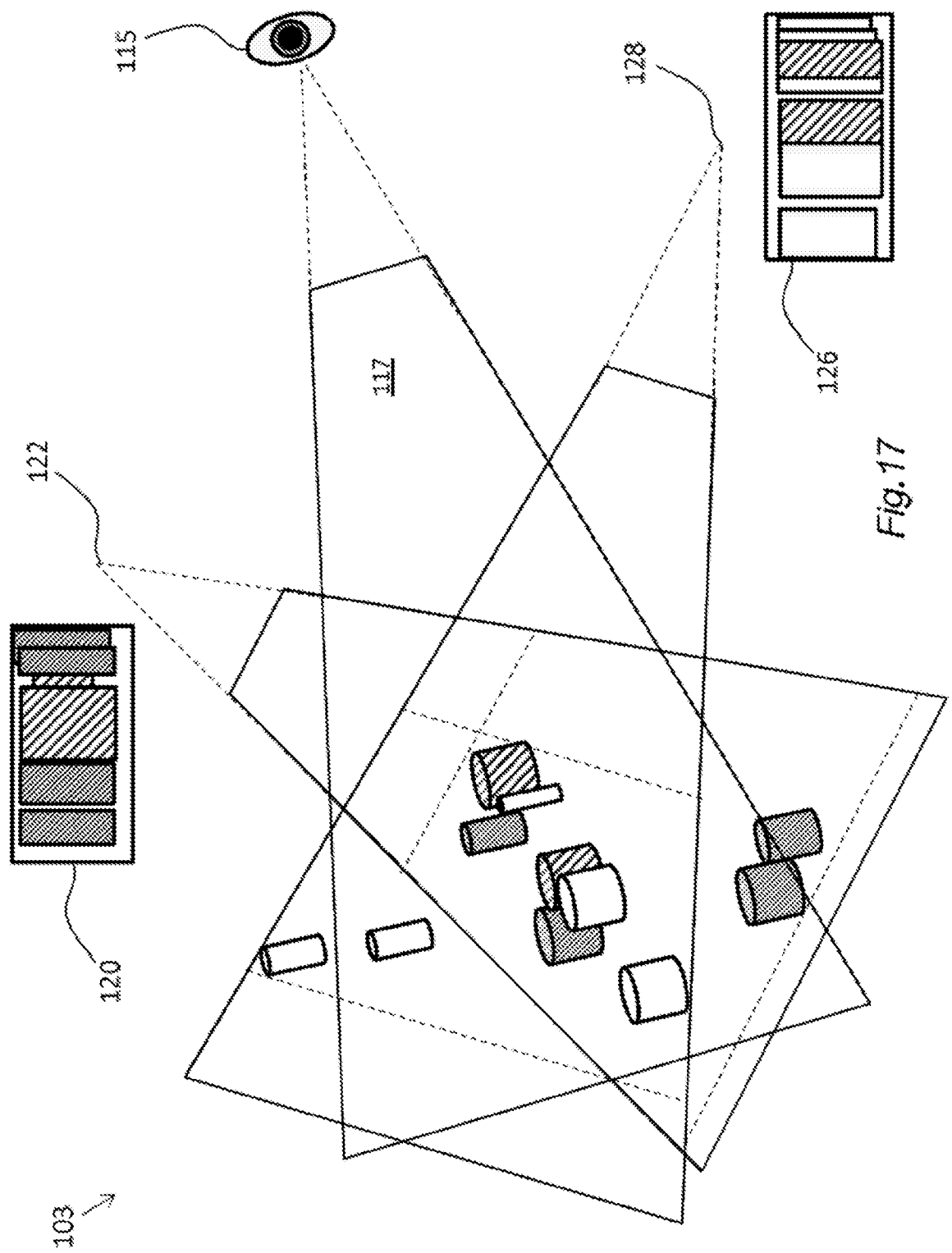
FIG. 17 is a representational view of the FIG. 16 virtual world, in another stage.

Referring to FIG. 17, a further second tile 126 may be determined based on the location of a different camera 128. The metadata for the shown further second tile 126 indicates $D_{min}$, $D_{max}$ for the RGB+D second video data and the resulting volume also falls within the FOV or frustum 117. It will be noted that none of the darker objects are visible from the location of this camera 128.

Figure 18:
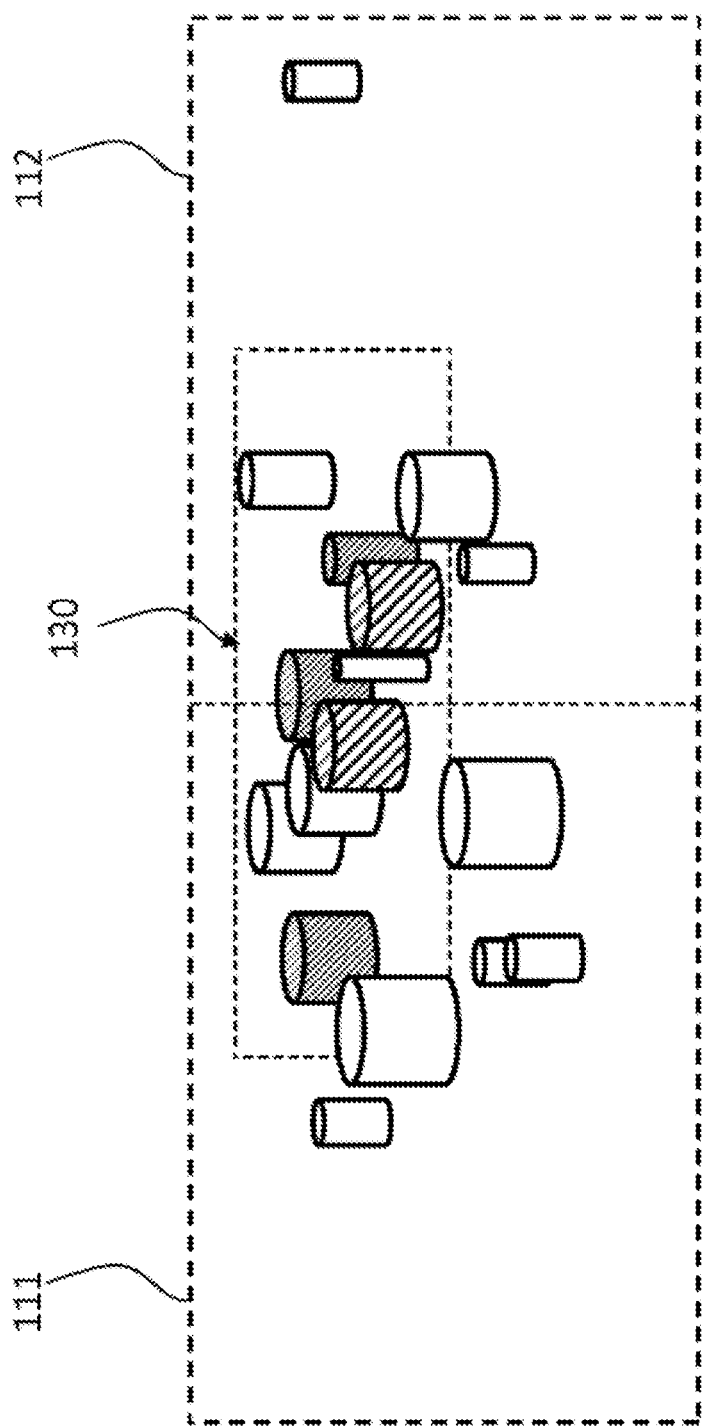
FIG. 18 is a representational view of rendered foreground and background content.

Referring to FIG. 18, when the first and second layers 102, 103 are rendered the invalid region 121 shown in FIG. 15 is now replaced with valid pixels 130 representing a combination of the data derived from the screen tiles of the second tiles 120, 126.

Figure 19:
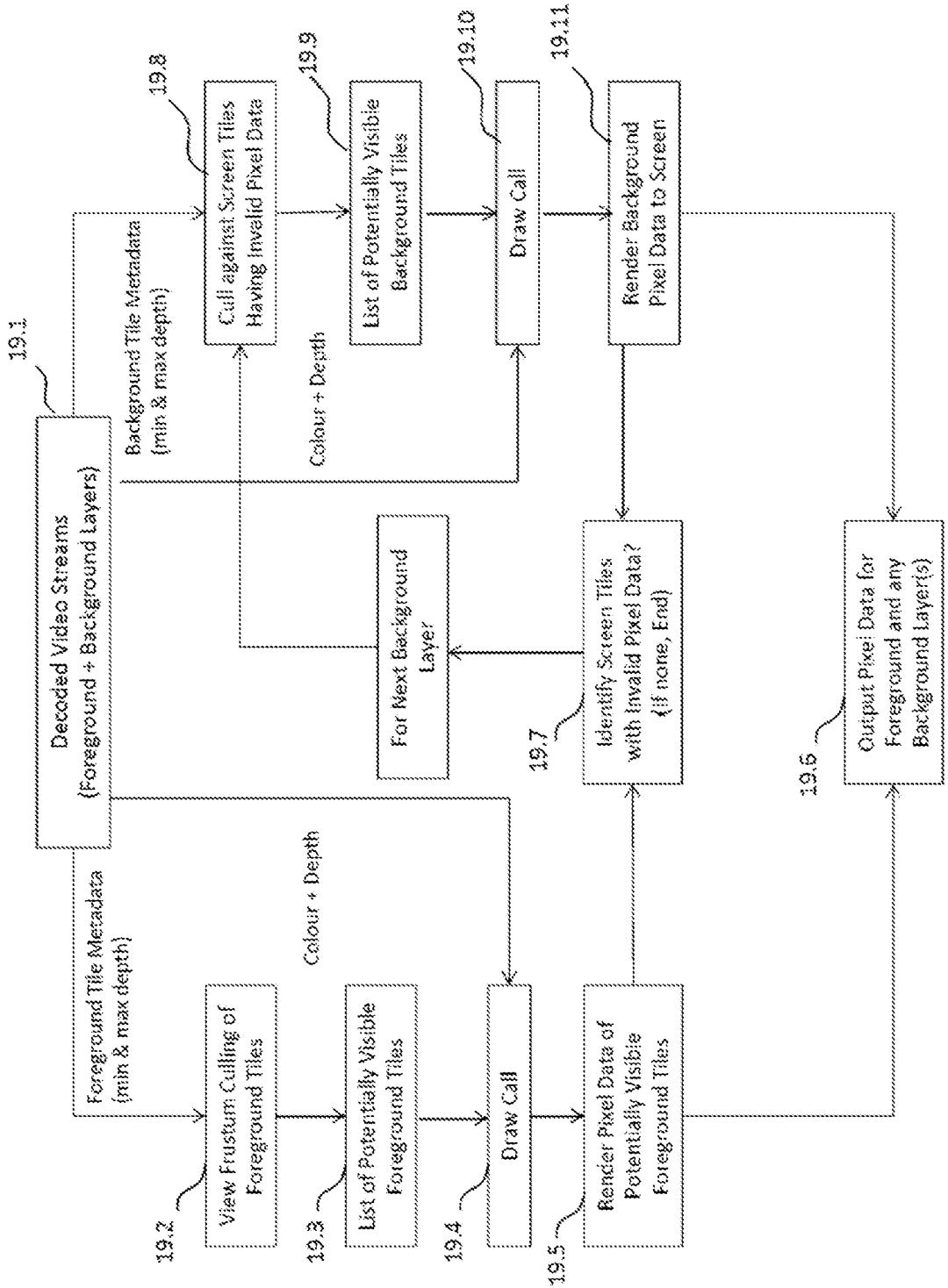
FIG. 19 is a flow diagram showing processing steps performed at the media player of FIG. 10, according to another embodiment of the invention.

FIG. 19 is a flow diagram indicating steps performed by the software application 95 in accordance with other embodiments.

A first step 19.1 comprises receiving the decoded video streams, comprising foreground and background layers. A further step 19.2 comprises view frustum culling of foreground tiles based on the metadata for each of the first tiles. A further step 19.3 comprises generating a list of potentially visible foreground tiles, based on step 19.2. A further step 19.4 comprises performing a draw call on the foreground tiles in the list, using the colour and depth data from the decoded potentially visible foreground tiles, to render said tiles in step 19.5. A further step 19.6 comprises outputting the rendered pixel data to the VR display 20.

The rendered foreground tiles in step 19.5 may be arranged as screen tiles, i.e. for display. The screen tiles may be of a different size and/or shape than the first tiles.

A step 19.7 comprises identifying any screen tiles with invalid pixel data. If there are no screen tiles with invalid data, then the process ends. If there are invalid screen tiles, another step 19.8 comprises performing a background tile cull against the screen tiles with invalid data. This may comprise projecting, e.g. the second tile volumes or cuboid (s), to the screen tiles and rejecting those second tile volumes not corresponding to the screen tiles. Another step 19.9 comprises generating a list of potentially visible background tiles, based on step 19.8. These are the background tiles not rejected in step 19.8. A further step 19.10 comprises performing a draw call on the background tiles in the list, using the colour and depth data from the decoded video streams, to render the background tiles in step 19.11. The process then moves to steps 19.6 and 19.7.

The methods and systems may automatically optimise and cull multiple layers of rendering content.

The metadata values of $D_{min}$, $D_{max}$ may be calculated offline, or may be calculated by the media player 10 in real-time. In this sense, the step of receiving metadata in step 11.2, for example, may involve receiving the metadata from a locally-performed process based on the depth map of the graphical data.

The depth range data may be calculated for a coarse resolution of tiles, e.g. 32×32 to save bandwidth if said data is transmitted as metadata by a remote source. This would be a preferred method for mobile GPUs, for example. For more powerful GPUs, e.g. on a desktop computer, there may be sufficient power to do a depth range calculation for any tile size.

An advantage of the methods and systems is that the graphical data, e.g. the RGB colour and depth data, is only accessed if the tile is potentially visible from the culling tests. If one or more previous layers have not provided data to replace invalid data, said data can be derived from a new layer.

In systems employing a separate CPU (e.g. the controller 81) and GPU, the amount of tile data that is sent to the GPU may be reduced, because the draw call is made from the CPU to the GPU only for selected tiles. Processing of individual tiles may start on the CPU, e.g. by receiving or generating the metadata, and culling the tiles against the view frustum, with graphical data for only potentially visible tiles being transferred to the GPU.

Culling can be done e.g. with fixed function rasterization using conservative rasterization or with a compute kernel, manually. With conservative rasterization, each rasterization pixel represents one screen tile. One screen tile can be of a different size than the first tiles.

In the above embodiments, the tile size and shape can be automatically selected or user selected.

Advantages include, but are not necessarily limited to, a reduced bandwidth between a CPU and the GPU (if used), a reduced bandwidth for reading per-pixel data on the GPU, reduced processing intensity, reducing the overdrawing of layers, and a system that is easily expandable.

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:
1. A method comprising:
receiving a first video data representing a three-dimensional video content arranged as a plurality of first tiles associated with respective sub-areas of an image;
providing data indicating, for a first tile of the plurality of first tiles, a depth range of the three-dimensional video content within said first tile;

determining for the first tile a respective three-dimensional volume based on the depth range of the three-dimensional video content within said first tile;

determining a field of view of a user for the three-dimensional video content based, at least partially, on a viewing position and a viewing orientation of the user;

comparing the determined field of view with the three-dimensional volume of the first tile; and rendering of the first video data for one or more first tiles of the plurality of first tiles in response to a determination that the determined three-dimensional volume of the first tile is at least partially within the determined field of view, wherein the one or more first tiles comprises, at least, the first tile.

2. The method of claim 1, further comprising:

providing one or more screen tiles associated with the rendering of the first video data;

identifying one or more screen tiles having invalid pixel data;

receiving a second video data representing the three-dimensional video content captured from a different location than the first video data, the second video data being arranged as one or more second tiles;

identifying one or more second tiles corresponding to at least one of the one or more screen tiles having the invalid pixel data; and rendering pixel data of the identified one or more second tiles.

3. The method of claim 2, further comprising providing data indicating for respective second tiles of the one or more second tiles a depth range of the three-dimensional video content within said one or more second tiles; and determining for the respective second tiles of the one or more second tiles a respective volume based on the depth range, wherein the one or more second tiles volumes are projected onto the one or more screen tiles, and are identified as corresponding to the one or more screen tiles having the invalid pixel data in response to their volumes covering said one or more screen tiles having the invalid pixel data.

4. The method of claim 2, wherein the first and second video data represent first and second layers of the three-dimensional video content, respectively.

5. The method of claim 4, wherein the first video data represents a foreground layer and the second video data represents a first background layer.

6. The method of claim 4, further comprising:

providing the one or more screen tiles after rendering the pixel data of the one or more identified second tiles;

receiving third video data representing a third layer of the three-dimensional video content, behind the second layer, the third video data being arranged as one or more third tiles;

identifying one or more third tiles corresponding to at least one or more of the one or more screen tiles having the invalid pixel data; and rendering pixel data of the identified one or more third tiles.

7. The method of claim 1, wherein the field of view is a view frustum projected from the viewing position of the user towards the three-dimensional video content.

8. The method of claim 1, wherein rendering is initiated with a single draw call.

9. The method of claim 8, wherein the one or more screen tiles are provided after the single draw call.

10. An apparatus comprising a processor, a non-transitory memory, and a computer program code residing in the memory, wherein the computer program code when executed with the processor, cause the apparatus to:

receive a first video data representing a three-dimensional video content arranged as a plurality of first tiles associated with respective sub-areas of an image;

provide data indicating, for a first tile of the plurality of first tiles, a depth range of the three-dimensional video content within said first tile;

determine for the first tile a respective three-dimensional volume based on the depth range of the three-dimensional video content within said first tile;

determine a field of view of a user for the three-dimensional video content based, at least partially, on a viewing position and a viewing orientation of the user;

compare the determined field of view with the three-dimensional volume of the first tile; and render the first video data for one or more first tiles of the plurality of first tiles in response to a determination that the determined three-dimensional volume of the first tile is at least partially within the determined field of view, wherein the one or more first tiles comprises, at least, the first tile.

11. The apparatus according to claim 10, wherein the apparatus is further caused to:

provide one or more screen tiles associated with the rendering of the first video data;

identify one or more screen tiles having invalid pixel data;

receive a second video data representing the three-dimensional video content captured from a different location than the first video data, the second video data being arranged as one or more second tiles;

identify one or more second tiles corresponding to at least one of the one or more screen tiles having the invalid pixel data; and render pixel data of the identified one or more second tiles.

12. The apparatus according to claim 11, wherein the computer program code when executed with the processor, further cause the apparatus to:

providing data indicating for respective second tiles of the one or more second tiles a depth range of the three-dimensional video content within said one or more second tiles; and determining for the respective second tiles of the one or more second tiles a respective volume based on the depth range, wherein the one or more second tiles volumes are projected onto the one or more screen tiles, and are identified as corresponding to the screen tiles having the invalid pixel data in response to their volumes covering said one or more screen tiles having the invalid pixel data.

13. The apparatus according to claim 11, wherein the first and second video data represent first and second layers of the three-dimensional video content, respectively.

14. The apparatus according to claim 13, wherein the first video data represents a foreground layer and the second video data represents a first background layer.

15. The apparatus according to claim 13, wherein the apparatus is further caused to:

provide the one or more screen tiles after rendering the pixel data of the one or more identified second tiles;

receive third video data representing a third layer of the three-dimensional video content, behind the second layer, the third video data being arranged as one or more third tiles;

identify one or more third tiles corresponding to at least one or more of the one or more screen tiles having the invalid pixel data; and render pixel data of the identified one or more third tiles.

16. The apparatus according to claim 10, wherein the field of view is a view frustum projected from the viewing position of the user towards the three-dimensional video content.

17. The apparatus according to claim 16, wherein the position of the user is determined based on positional data received from a user device.

18. The apparatus according to claim 10, wherein rendering is initiated by a single draw call.

19. The apparatus according to claim 18, wherein the one or more screen tiles are provided after the single draw call.

20. A computer program product embodied on a non-transitory computer readable medium, comprising computer program code configured to, when executed on at least one processor, cause an apparatus or a system to:

receive a first video data representing a three-dimensional video content arranged as a plurality of first tiles associated with respective sub-areas of an image;

provide data indicating, for a first tile of the plurality of first tiles, a depth range of the three-dimensional video content within said first tile;

determine for the first tile a respective three-dimensional volume based on the depth range of the three-dimensional video content within said first tile;

determine a field of view of a user for the three-dimensional video content based, at least partially, on a viewing position and a viewing orientation of the user;

compare the determined field of view with the three-dimensional volume of the first tile; and render the first video data for one or more first tiles of the plurality of first tiles in response to a determination that the determined three-dimensional volume of the first tile is at least partially within the determined field of view, wherein the one or more first tiles comprises, at least, the first tile.

* * * * *